Figure 1:
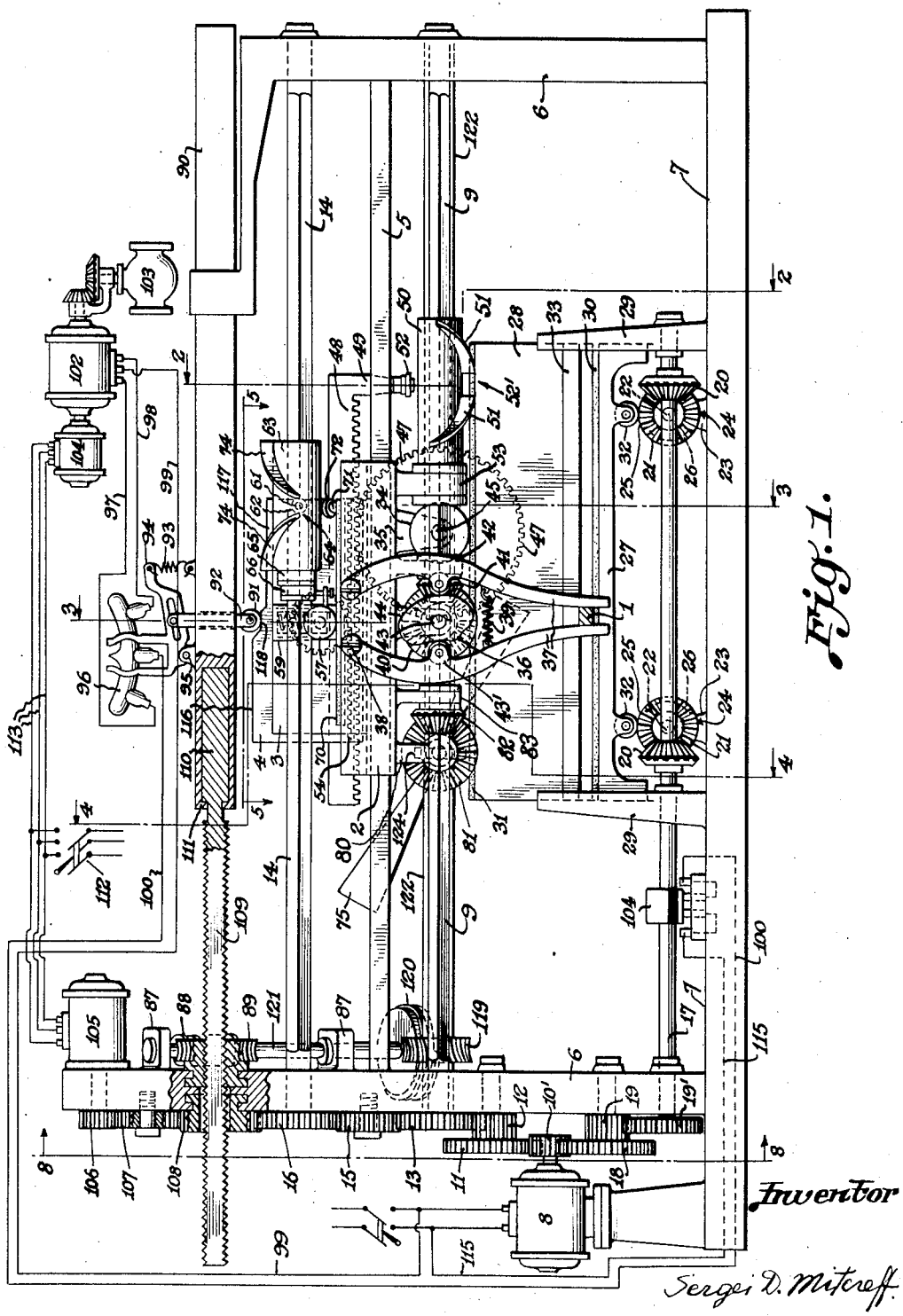

Dec. 3, 1935.  S. D. MITEREFF  2,022,818
REGULATOR
Filed June 14, 1934  4 Sheets-Sheet 1

Inventor
Sergei D. Mitreff

Dec. 3, 1935.  S. D. MITEREFF  2,022,818
REGULATOR
Filed June 14, 1934  4 Sheets-Sheet 2

Inventor
Sergei D. Mitereff

Dec. 3, 1935.   S. D. MITEREFF   2,022,818
REGULATOR
Filed June 14, 1934   4 Sheets-Sheet 3
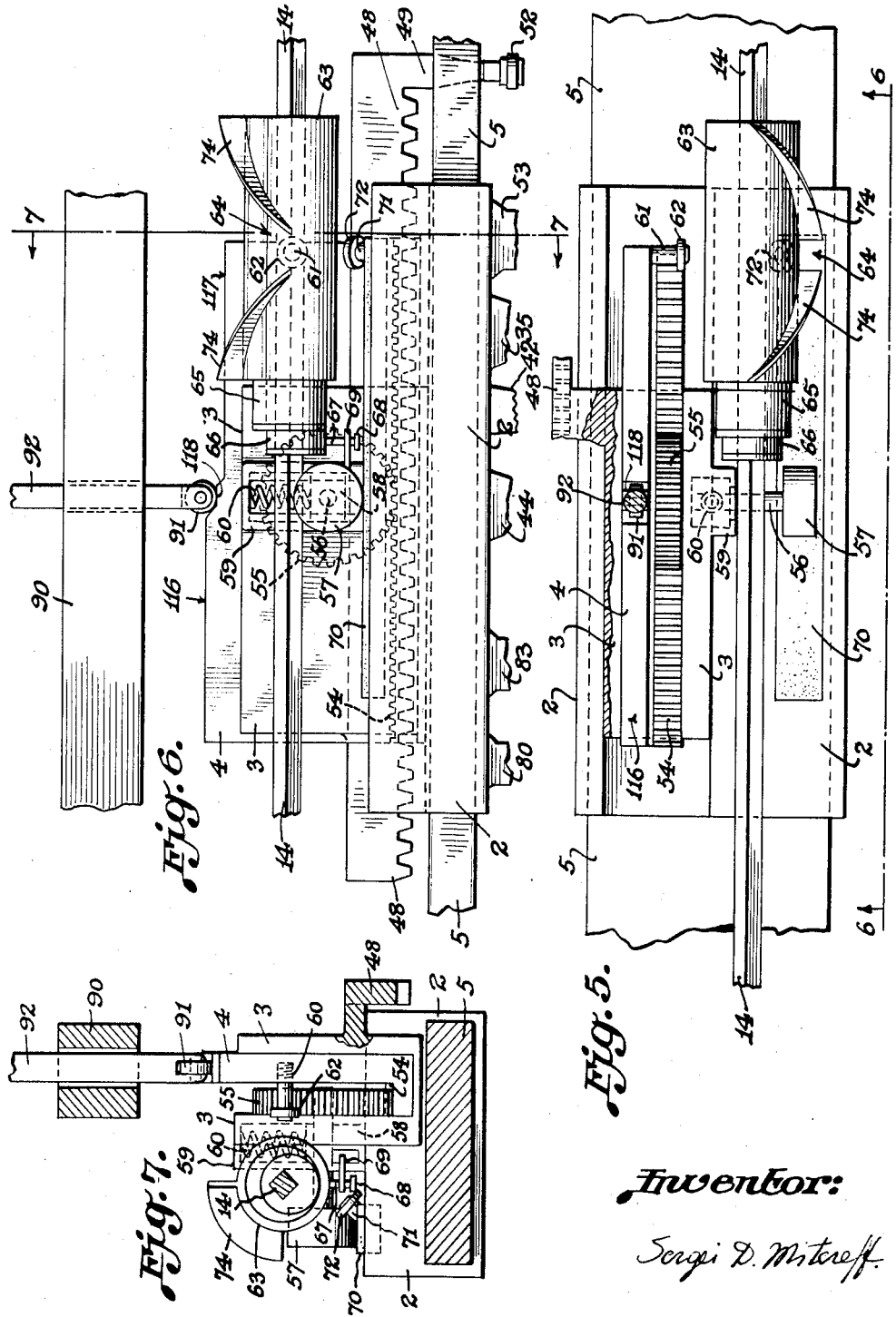
Inventor:
Sergei D. Mitereff Dec. 3, 1935.  S. D. MITEREFF  2,022,818
REGULATOR
Filed June 14, 1934   4 Sheets-Sheet 4
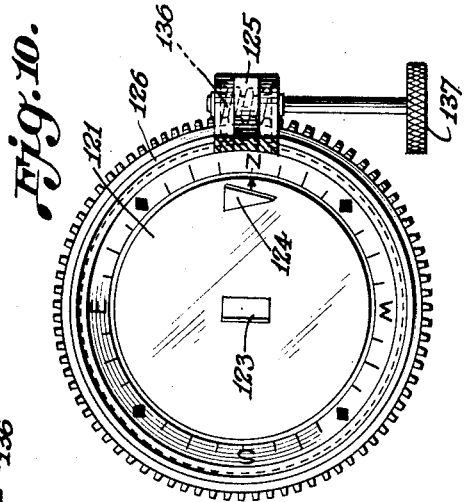
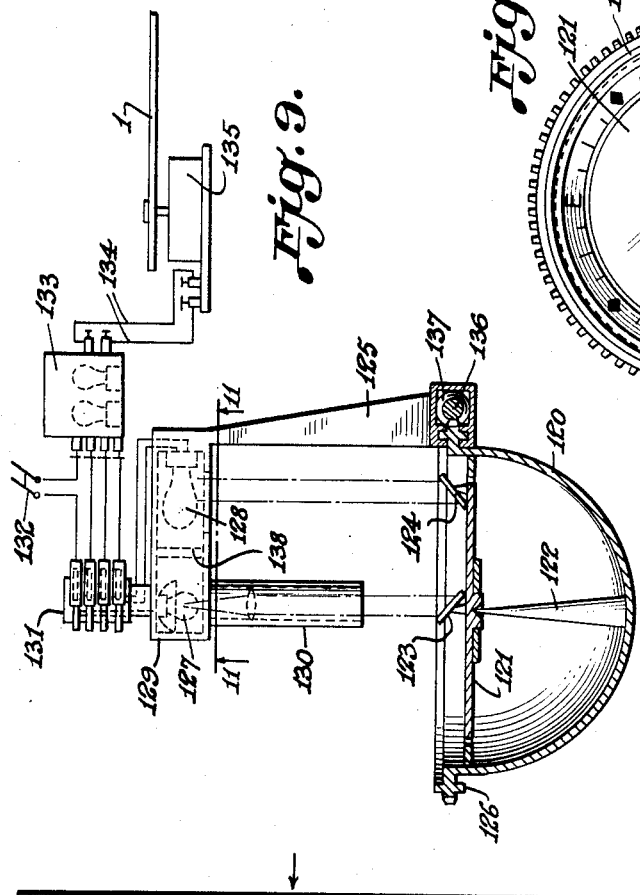
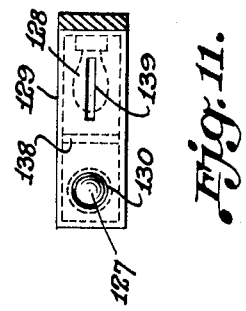
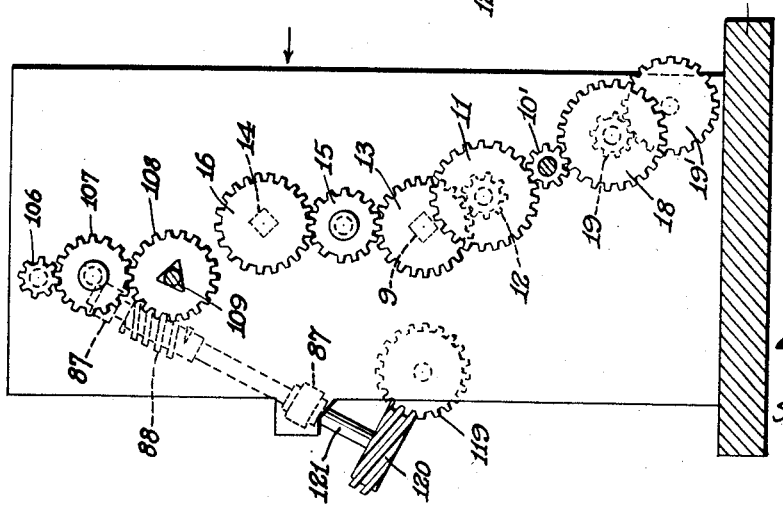
Inventor:
Sergei D. Mitereff Patented Dec. 3, 1935

2,022,818

UNITED STATES PATENT OFFICE 2,022,818

REGULATOR

Sergei D. Mitereff, Petersburg, Va.

Application June 14, 1934, Serial No. 730,634

6 Claims. (Cl. 172—239)

In the U. S. Patent No. 1,955,680 on "Automatic electric regulator" I disclosed a new improved type of automatic regulator operating in a regular cyclical manner.

The main advantage of that regulator lies in its characteristic which can be expressed mathematically as follows:

$$F = k_1 P + k_2 \frac{dP}{dT} + k_3 T \quad \text{---------} \quad (1)$$

Where:

F—distance traversed by the regulating valve (or any other regulating means proper) from the position it occupied at the starting point.

P—amount of deviation of the controlled function (pressure, temperature, etc) from its normal value.

d—mathematical symbol used in calculus designating an infinitesimally small increment.

T—time.

$k_1$, $k_2$ and $k_3$—arbitrary constants of adjustment.

As was explained in the above referred to patent, the term $$k_2 \frac{dP}{dT}$$

in the Equation (1) is capable of counteracting the time lag in the transmission of the impulses from their source to the regulator due to such factors, for example, as friction and the orifice effect of a long pilot line.

Since, however, in many control installations the time lag in transmission of the impulses is due sometimes not only to the friction (or its equivalent) but also to the inertia (or its equivalent) of the impulse transmitting means the regulator of the characteristic expressed by the Equation (1) may not be adequate in such installations.

In order to cope also with this later difficulty I designed an improved automatic regulator of the same general type as covered in the Patent No. 1,955,680.

The characteristic of this new regulator can be best expressed mathematically as follows:

$$F = k_1 \int_{T_1}^{T_2} P dT + k_2 P + k_3 \frac{dP}{dT} + k_4 \frac{d^2P}{dT^2} \quad \text{-----} \quad (2)$$

Where the same notations are used as in the Equation (1) except that:

$\int_{T_1}^{T_2}$ —sign of integration (summation) used in calculus.

$\frac{d^2P}{dT^2}$ —mathematical expression meaning the rate of the rate of change of the function P.

$k_3$, $k_4$—additional constants of adjustment.

The term $$k_4 \frac{d^2P}{dT^2}$$

is capable of counteracting the time lag in the transmission of the impulses due to the inertia of either the impulse transmitting means or of any other part of the control system such, for example, as the inertia of water in the penstock in case of the speed control of a hydraulic turbine.

A further application of my regulator is for the purpose of the automatic steering of ships, airships, airplanes, torpedoes and other movable objects.

In this particular application one of the main difficulties encountered is the time lag in indicating the correct course of the vessel existing in the compass and produced by the inertia of the moving parts of the compass and also by the fluid or other dampening device incorporated in the compass for the purpose of steadying it.

Moreover, an ordinary magnetic compass does not have enough power to actuate an ordinary regulator. In order to overcome these obstacles the use was made of the gyro-compass as the impulse producing means for the automatic steering mechanisms designed previous to my invention.

My new regulator, however, counteracts the time lag of the compass by virtue of having in its characteristic the sum:

$$k_3 \frac{dP}{dT} + k_4 \frac{d^2P}{dT^2}$$

while the low power of the ordinary magnetic compass is of no import when used as the actuating means for my regulator due to its advantageous construction as will be explained later.

A further important advantage of my new regulator is that it sends only one impulse at each cycle to the regulating means proper (a valve, for example) instead of three separate impulses sent by the regulator of the Patent No. 1,955,680.

The substitution of the term $$k_1 \int_{T_1}^{T_2} P\, dT$$

in the Equation (2) above for the term $k_4T$ in the Equation (1) above is conducive to a better regulation since the term $k_1 P dT$ is theoretically correct one whereas the term $k_4T$ is only an approximation.

In order to illustrate the means by which the principle of my invention can be reduced to practice the reference is made to the drawings attached to this specification.

In the accompanying drawings like characters of reference indicate like parts in the several views and:

Fig. 1 is a front elevation of the complete invention.

Figure 3:
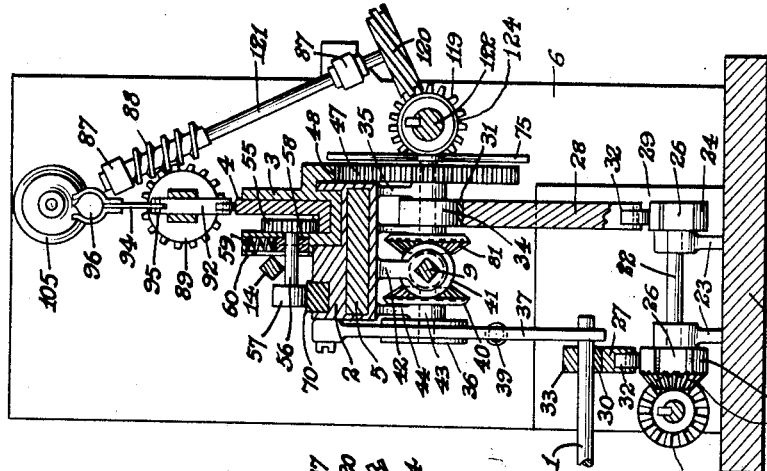
Figure 2:
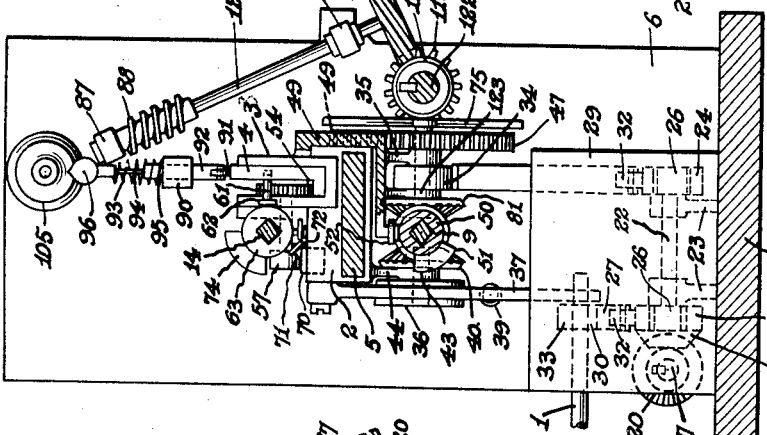
Figure 4:
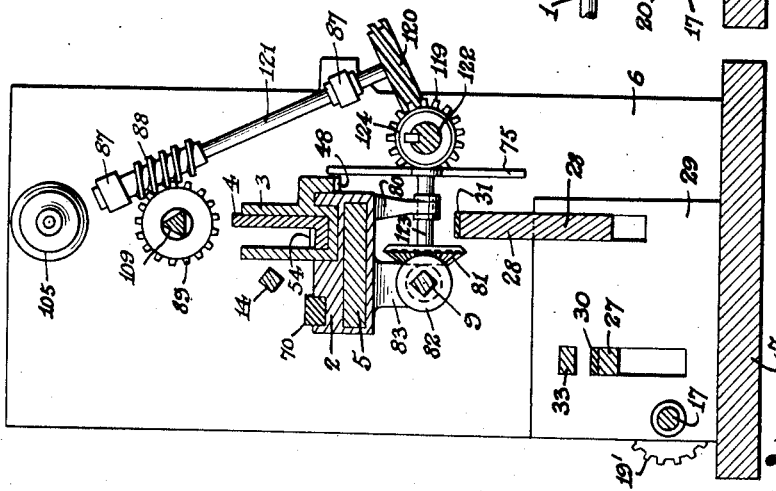

Fig. 2 is the section on the line 2—2 of Fig. 1.
Fig. 3 is the section on the line 3—3 of Fig. 1.
Fig. 4 is the section on the line 4—4 of Fig. 1.
Fig. 5 is the enlarged plan view of the Fig. 1 looking from the line 5—5.
Fig. 6 is the view from the line 6—6 of Fig. 5.
Fig. 7 is the section on the line 7—7 of Fig. 6.
Fig. 8 is the side elevation of the device looking from the line 8—8 of Fig. 1.
Fig. 9 is the side section of the compass installation used in connection with my device when employed for automatic steering.
Fig. 10 is the plan view of Fig. 9.
Fig. 11 is the view looking from the line 11—11 of Fig. 9

The embodiment of the invention here disclosed consists essentially of the pointer 1 belonging to an indicating instrument such as a pressure gage, temperature indicator, course indicator, tachometer, etc. and bars 2, 3 and 4.

The bar 2 is mounted slidably on the rectangular cross-member 5 fixed at its ends in the pedestals 6 placed upon the base 7. The bar 3 is mounted slidably on the bar 2, whereas the bar 4 is mounted slidably upon the bar 3 with the result that the bar 2 serves as a carriage for the bar 3 while the bar 3 in turn serves as a carriage for the bar 4.

In this way the total distance traversed by the bar 4 is equal to the algebraic sum of the distance traversed by the bar 2 plus the relative motion between the bar 2 and the bar 3 plus the relative motion between the bar 3 and the bar 4.

The motive power for actuating the above mentioned bars is provided by the constant speed motor 8.

This motor rotates the rectangular drive member 9 through the gear chain consisting of the pinion 10 keyed to the shaft of the motor 8, the gear 11 meshing with the pinion 10 and which carries the pinion 12, and the gear 13 keyed to the member 9 and meshing with the pinion 12.

The second rectangular drive member 14 is rotated by the motor 8 through the idler 15 meshing with the gear 13 and through the gear 16 keyed to the member 14 and meshing with the idler 15.

The shaft 17 is rotated by the motor 8 through the gear 18 meshing with the pinion 10 which carries the pinion 19 and through the gear 19' keyed to the shaft 17 and meshing with the pinion 19.

These gears are so proportioned that the drive members 9 and 14 and the shaft 17 are rotated at the same speed.

The shaft 17 carries two bevel gears 20 which mesh with the bevel gears 21 keyed to the shafts 22 supported in the bearings 23 mounted upon the base 7.

Each of the shafts 22 carries two cams 24 having a long arcuate portion of a greater radius 25 and a short arcuate portion of a smaller radius 26. The two cams 24 of each shaft are keyed on the shaft 22 in phase with each other and symmetrically in respect to the cams of the other shaft 22.

The bevel gears 20 and 21 are of the same size. The purpose of the cams 24 is to alternately raise and lower in unison the lock bar 27 and the friction plate 28 at each revolution of the cams. The lock bar 27 and the friction plate 28 are mounted slidably in the pedestals 29 which are provided with the vertical slots into which fit the ends of the bar 27 and of the plate 28.

The upper surface of the bar 27 and the plate 28 is covered with a thin layer 30 and 31 respectively of hard resilient material such, for instance, as the hard rubber.

The bar 27 and the plate 28 are provided on their bottom surface with the rollers 32 which rest upon the cams 24.

Just above the slidable lock bar 27 and parallel thereto is located a stationary lock bar 33 fixed at its ends in the pedestals 29.

The pointer 1 is mounted to protrude in the slot formed by the bar 27 and the bar 33.

Just above the friction plate 28 is located the friction wheel 34 which is suspended from the carriage bar 2 by the bearing 35.

The cams 24 are so proportioned that when the rollers 32 are supported by their arcuate portion of the larger radius the bar 27 presses the pointer 1 against the bar 33 wtih a force sufficient to lock the pointer 1 and to prevent it from moving sidewise, while the plate 28 presses upon the friction wheel 34 with a force sufficient to cause the rotation of the wheel 34 when the carriage bar 2 is moving sidewise.

The carriage bar 2 is moved sidewise, on the other hand, by the arrangement consisting of the cam 36 and the pair of tongs 37. These tongs are fastened to the carriage 2 at their upper ends by the screws 38 in such a way as to be able to rotate around these screws.

At their lower portion the tongs 37 are being continuously pulled together by the tension spring 39.

The lower ends of the tongs 37 stride the pointer 1.

The cam 36 is keyed to the shaft 43 suspended by the bearing 44 from the carriage 2. To the other end of the shaft 43 is keyed the bevel gear 40 meshing with the bevel gear 41.

The gear 41 is mounted slidably on the rectangular drive member 9 and is suspended by the bearing 42 from the carriage bar 2.

The bevel gear 40 is twice the size of the gear 41 with the result that the cam 36 makes one revolution for the two revolutions of the rectangular drive member 9 and of the shaft 17.

The tongs 37 are provided at their middle with the rollers 43' bearing upon the cam 36 with the result that tongs 37 are being opened and closed upon the pointer 1 at regular intervals.

The carriage bar 2 is being moved by the tongs 37 in the following manner. The cams 36 and 24 are in such angular relation to each other that when the lock bar 27 is lowered by the cams 24 the tongs 37 are opened by the cam 36 with the result that the pointer 1 is free to move sidewise. Just after the bar 27 is raised by the cams 24 and the pointer 1 is thus locked, the tongs 37 begin to close on the pointer due to the operation of the cam 36 and when either of the tongs touches the pointer 1 the carriage bar 2 starts to move in the same direction as the pointer 1 was moving when it was free.

This movement of the carriage bar 2 is produced by the effort of the spring 39 to pull tongs 37 together while the lower end of that tong which touches the pointer 1 is acting as a support, with the result that when both tongs 37 close finally upon the pointer 1 the carriage bar 2 traversed the distance equal to the distance traversed by the pointer 1 during the period when it was unlocked.

After this there will be an interval during which the tongs 37 will stay closed upon the pointer 1 while the lock bar 27 will stay in its upper position. At the conclusion of this interval the tongs 37 are opened by the cam 36 simultaneously with the lowering of the lock bar 27 by the cams 24. The pointer 1 is now free to move again until it is locked by the next upward movement of the bar 27 at which moment the tongs 37 begin to close and to move the carriage 2.

The above described cycle is repeated at each revolution of the shafts 17 and 9 with the result that if the pointer 1 continues to move, the carriage bar 2 is being moved to follow it at each cycle. The friction wheel 34 is keyed to the shaft 45 which is suspended by the bearing 35 from the carriage bar 2. To the other end of the shaft 45 is keyed the gear 47.

The bar 3, which slides upon the bar 2 in a suitable groove, overhangs the bar 2 just above the gear 47 and this overhanging portion is provided with a rack 48 meshing with the gear 47.

The right hand end of the rack 48 is provided with an arm 49 which extends downward and toward the rectangular drive member 9.

On this member 9 is mounted slidably a cylinder 50 carrying two short portions of screw formation 51 of the opposite hand located in opposition to each other and separated by the gap 52'. The lower end of the arm 49 is provided with the roller 52 which fits into the gap 52'.

The cylinder 50 is suspended from the carriage bar 2 by the bearing 53.

The cylinder 50 is being rotated by the rectangular member 9 and as the screw formations pass the roller 52 they move the bar 3 so as to make the roller 52 pass through the gap 52'.

The movement of the bar 3 is effected in the following manner.

It has been explained before that at the same moment as the pointer 1 is locked by the bar 27 the plate 28 is brought into contact with the friction wheel 34 and it is lowered out of engagement with the friction wheel 34 at the same moment as the pointer 1 is released by the bar 27.

On the other hand the screw formations 51 pass the roller 52 during the period when the plate 28 is in its lower position.

Therefore, as soon as the carriage bar 2 starts to move through the action of the tongs 37, the friction wheel 34 begins to roll on the plate 28 with the result that the gear 47 starts to turn and to move through the rack 48, the bar 3 in respect to the carriage bar 2.

In this way at the conclusion of the movement of the bar 2 the bar 3 traversed the distance in respect to the bar 2 which is proportional to the travel of the bar 2 and is proportional therefore also to the travel of the pointer 1 during the interval when it was unlocked by the bar 27.

The extent of this relative movement of the bar 3 depends upon the relative size of the friction wheel 34 and the gear 47 and it can be changed by changing their relative size.

When the plate 28 is lowered, the screw formations 51 pass underneath the roller 52 and return the bar 3 into its original position in respect to the carriage 2.

At the next revolution of the shaft 17 the cycle is repeated, that is the bar 3 is moved in respect to the bar 2 a distance proportional to the distance traversed by the pointer 1 for this cycle to be returned into its original position by the action of the screw formations 51 upon the roller 52.

The bar 3 is made hollow and it carries inside of it the bar 4 the lower part of which is provided with a rack 54 which meshes with the gear 55 keyed to the shaft 56 to the other end of which is keyed the friction wheel 57. The shaft 56 passes through the block 58 mounted slidably in the case 59 attached to the bar 3.

The block 58 is being pressed downward by the spring 60 located in the case 59. The bar 4 is provided on its right hand end with the pin 61 carrying the roller 62.

On the rectangular drive member 14 is mounted slidably a cylinder 63 carrying on its surface two short portions of screw formation 74 of the opposite hand placed in opposition to each other and separated by the gap 64.

The cylinder 63 is supprted from the bar 3 by the bearing.

On the end of the cylinder 63 protruding from the bearing 65 is mounted the eccentric 66 carrying the pin 67 having at its end the head 68.

The pin 67 protrudes through the hole made in the lever 69 attached to the block 58.

The friction wheel 57 rests normally on the friction strip 70 which is mounted slidably in a groove made in the upper surface of the bar 2.

At its right hand end the strip 70 is provided with the pin 71 carrying the roller 72.

The movement of the bar 4 is effected in the following manner.

Immediately after the carriage bar 2 and the bar 3 are moved through the action of the tongs 37 and the friction wheel 34, the screw formations 74 pass the roller 72 and move the friction strip 70 a distance necessary to make the roller 72 pass through the gap 64. After this movement is completed, the friction strip 70 remains stationary until the corresponding period of the next cycle. In the interval the bar 3 is returned into its original position with respect to the carriage bar 2 as was explained before. Since the cylinder 63 is moving together with the bar 3 it is clear that the the distance traversed by the strip 70 in respect to the carriage bar 2, when the screw formations 74 pass the roller 72, is equal to the difference between the distance traversed by the bar 3 in respect to the bar 2 for the cycle under consideration and the distance traversed by the bar 3 in respect to the bar 2 for the previous cycle.

As was explained before the distance traversed by the bar 3 in respect to the bar 2 is proportional to the distance traversed by the pointer 1 for the cycle under consideration.

Since the length of time during which the pointer 1 is free to move is equal for each cycle, the distance traversed by the pointer 1 at each cycle is proportional to the average rate of change of the function (pressure, temperature, speed, compass deviation, etc.) indicated by the pointer 1.

Therefore the distance traversed by the bar 3 in respect to the bar 2 at each cycle and before the bar 3 is returned into its original position is also proportional to the average rate of change of the above function for this cycle.

It is clear therefore that the difference between two successive distances traversed by the bar 3 in respect to the bar 2 is proportional to the average rate of the rate of change of the function indicated by the pointer 1.

Since the distance traversed by the friction strip 70 at each cycle is equal to the difference between two successive distances traversed by the bar 3 in respect to the bar 2 it follows that the distance traversed by the friction strip 70 is also proportional to the rate of the rate of change of the function indicated by the pointer 1 for the cycle under consideration.

Now, in moving, the friction strip 70 rotates the friction wheel 57 which in turn moves the bar 4 in respect to the bar 3 by means of the gear 55 and the rack 54.

The distance traversed by the bar 4 in respect to the bar 3 due to operation of the friction strip 70 is evidently proportional to the distance traversed by the friction strip 70 in relation to the bar 2 and is proportional therefore to the rate of the rate of change of the function indicated by the pointer 1 for the cycle under consideration.

After the completion of the movement of the bar 4 due to the operation of the friction strip 70 the bars 2, 3 and 4 are at the standstill until the time when the screw formations 74 start to pass the roller 62. At this moment the eccentric 66 lifts the shaft 56 and thus disengages the friction wheel 57 from the friction strip 70. The gear 55 stays in mesh with the rack 54 however. As the screw formations 74 pass the roller 62 they return the bar 4 into its original position in respect to the bar 3. This movement is not transmitted to the friction strip 70 because the friction wheel 57 is out of engagement with the friction strip 70 during this period. It is brought back into engagement with the strip 70 immediately afterwards by the eccentric 66 acting upon the slidable block 58.

Simultaneously with the return motion of the bar 4 the bar 3 is brought back into its original position in respect to the bar 2 by the operation of the screw formations 51 acting upon the roller 52, and this completes the cycle.

The movement of the bars 2, 3 and 4 for one whole cycle proceeds therefore in the following fashion.

After the bars 3 and 4 are returned into their original position in respect to the bars 2 and 3 respectively the lock bar 27 locks the pointer 1 while at the same moment the plate 28 engages the friction wheel 34, and the tongs 37 start to close.

As soon as one of the tongs 37 touches the pointer 1 the carriage bar 2 starts to move a distance equal to the deviation of the pointer 1 during the period when it was free to move previous to being locked by the bar 27.

Simultaneously with the movement of the bar 2 the bar 3 starts to move in respect to the bar 2 a distance proportional to the deviation of the pointer 1 for this cycle.

After the movement of the bars 2 and 3 is completed the bar 4 starts to move in respect to the bar 3 a distance proportional to the difference between the deviation of the pointer 1 for this and the preceding cycle.

After the movement of the bar 4 is completed there is an interval when all the bars are at the standstill. During this period the tongs 37 are still closed on the pointer 1 and both the lock bar 27 and the plate 28 are still in their upper position.

At the end of this period the tongs 37 are opened while the bar 27 and the plate 28 are lowered. At this moment the bars 3 and 4 start to be returned into their original position in respect to the bars 2 and 3 respectively, and the cycle is then repeated.

The rest of the mechanism will now be described.

Above the bar 4 and parallel thereto is located rectangular member 90 mounted slidably on its right hand end in the pedestal support 6. The left hand end of the member 90 is carrying the screw 109 having three flat surfaces around its circumference.

The screw 109 can rotate in the member 90 on account of the bearing 110 but can not slide out of it being restrained by the shoulder 111. The screw 109 passes through the gears 89 and 108 mounted rotatably in the pedestal support 6. The gear 89 is provided in its center with a threaded hole through which the screw 109 passes. The thread of the gear 89 engages the thread of the screw 109. The gear 108 is provided with a triangular hole in its center into which fit the three flat surfaces of the screw 109.

It follows from this description that if the gear 89 rotates while the gear 108 is stationary, the screw 109 moves sidewise by virtue of the thread of the gear 89 engaging the thread of the screw 109, while the screw 109 is prevented from rotating by its flat surfaces fitting into the triangular hole of the gear 108. On the other hand if the gear 108 rotates while the gear 89 is stationary, the screw 109 is moving sidewise being rotated by the gear 108 and screwing in and out of the threaded hole of the gear 89.

The gear 108 is meshing with the idler 107 which in turn meshes with the gear 106 keyed to the shaft of the Selsyn motor 105 mounted on the pedestal 6.

The Selsyn motor 105 is connected electrically with the Selsyn motor 104. The three phase current supply for this connection is provided by the switch 112 feeding lines 113 connecting the Selsyn motors. These Selsyn motors are of the standard make and their peculiarity is that when one of the motors is being rotated the other one is rotated in unison with it.

The Selsyn motor 105 is connected to the motor 102 and is rotated together with it. The motor 102 is driving through an appropriate gearing the valve 103. The valve 103 regulates the flow of a fluid which in some definite way affects the function indicated by the pointer 1. For instance if the regulator here described is used for the control of the temperature in the oven the valve 103 will regulate the supply of gas or other fuel to the furnace, while the pointer 1 will indicate the temperature in the oven. In case of the pressure control of air in a tank the valve 103 will regulate the flow of air to or from the tank, as the case may require, while the pointer 1 will indicate the pressure in the tank. In case of the automatic steering of a ship, for instance, the numeral 103 will indicate the rudder of the ship while the pointer 1 will belong to a course indicator. The preferred form of this course indicator will be described in details later on, and it is shown on the Fig. 9 and 10.

The motor 102 is of the reversible type. The middle terminal of the motor 102 is fed by the wire 99 which comes directly from the switch 101. The left (forward) terminal of the motor 102 is fed by the wire 97 which is connected at its other end to the left terminal of the mercury switch 96. The right (reverse) terminal of the motor 102 is connected by the wire 98 with the right terminal of the mercury switch 96. The middle terminal of this switch is connected by the wire 100 with one of the brushes of the rotary switch 104. The other brush of the switch 104 is connected by the wire 115 with the remaining pole of the switch 101. The three pole mercury switch 96 is mounted on the top of the rectangular member 90 by means of the bracket 94 pivoted at the fulcrum support 95. The bracket 94 is being pulled downwards by the spring 93 attached to the member 90. The bracket 94 is supported by the pin 92 carrying on its lower end the roller 91 which rests upon the upper surface of the bar 4.

The upper surface of the bar 4 consists of a long raised portion 116, a long lower portion 117 and a short portion 118 of a medium elevation. These parts are so proportioned that when the roller 91 rests upon the portion 118 the mercury switch is in its neutral position and no current is flowing to either the forward or reverse terminal of the motor 102.

When the roller 91 is resting on the portion 116, the mercury switch 96 is tilted to the left and the wire 97 is connected with the wire 100 with the result that the moor 102 runs forward provided the switch 104 is closed. On the other hand, when the mercury switch 96 is tilted to the right by virtue of the roller 91 being supported by the portion 117 the wire 98 is connected with the wire 100 and the motor 102 runs backward provided again that the switch 104 is closed.

The switch 104 is mounted on the shaft 17 and it is arranged to be closed just after the bar 4 completes its movement due to the operation of the friction strip 70 and is arranged to be opened just before the bars 4 and 3 are returned into their original position in respect to the bars 3 and 2 respectively. After this the switch 104 stays open for the balance of the cycle.

The way in which the valve 103 is operated will now be described.

It was explained already that as soon as the movement of the bars 2, 3 and 4 is completed the switch 104 closes. If the short portion 118 of the bar 4 is not directly under the roller 91 the mercury switch 96 is now tilted either to the left or to the right depending on whether the roller 91 rests upon the portion 116 or the portion 117 of the bar 4.

Since now both the switch 104 and the switch 96 are closed the motor 102 starts to rotate. It means also that the Selsyn motors 104 and 105 are also rotating in unison with the motor 102.

Since the Selsyn motor 105 is geared to the gear 108 this gear is also rotating therefore as the motor 102. The hand of the screw 109 is so selected that as the screw 109 is rotated by the gear 108 it moves in such a direction as to move the roller 91 toward the portion 118 of the bar 4. As soon as the roller 91 is brought to bear upon the portion 118 the switch 96 is opened and the rotation of the motor 102 stops. After a while the switch 104 is opened and at this moment the bars 4 and 3 are starting to be returned into their original position in respect to the bars 3 and 2 respectively. It should be pointed out that the speed of the motor 102 is so selected that the roller 91 is brought back on the portion 118 by the rotation of the motor 102 a considerable time before the switch 104 is opened. At the next cycle the bar 2 moves first to follow the deviation of the pointer 1 which was free to move during the period when the bars 3 and 4 were returning into their original positions. Simultaneously with the movement of the bar 2, the bar 3 moves in respect to the bar 2 a distance proportional to the increment of deviation of the pointer 1 during this cycle.

After the movement of the bar 2 and of the bar 3 is completed the bar 4 moves in respect to the bar 3 a distance proportional to the difference between the increment of deviation of the pointer 1 for this and the previous cycle.

Since the bar 3 is carried by the bar 2 and the bar 4 is carried by the bar 3 the total distance traversed by the portion 118 of the bar 4 in respect to the roller 91 is equal to the sum of the movement of the bar 2 plus the movement of the bar 3 in respect to the bar 2 plus the movement of the bar 4 in respect to the bar 3.

It should be pointed out that while the movement of the bar 2 and the bar 3 is of necessity in the same direction corresponding namely to the direction of the deviation of the pointer 1, the movement of the bar 4 in respect to the bar 3 is in the same direction if the increment of the deviation of the pointer 1 for this cycle is greater than the increment of its deviation for the previous cycle. If, on the other hand, the increment of the deviation of the pointer 1 is smaller for this cycle than it was for the preceding cycle, the direction of the motion of the bar 4 in respect to the bar 3 will be opposite to the direction of the movement of the bars 2 and 3.

Since the movement of the portion 118 of the bar 4 in respect to the roller 91 is the sum of the movements of the bars 2, 3 and 4 it follows that the extent and the direction of this movement depends upon the relative magnitude and the sign of the movements which add up to this sum.

In some cases, for instance, the portion 118 may be stationary in respect to the roller 91 in spite of the movement of the bars 2, 3 and 4. In this case, of course, the bar 4 is moved in respect to the bar 3 a distance equal to the sum of the distance traversed by the bar 2 plus the distance traversed by the bar 3 in respect to the bar 2, but the distance traversed by the bar 4 is in the opposite direction to that traversed by the bar 2 and the bar 3, with the result that the sum of the separate movements of the bars 2, 3 and 4 is zero so far as the roller 91 is concerned.

Since the roller 91 follows the portion 118 of the bar 4 being moved sidewise by the gear 108 which in turn is being rotated in unison with the rotation of the motor 102 operating the valve 103, it follows that the amount of actuation of the valve 103 for each cycle is proportional to the distance traversed by the portion 118 from the position it occupied at the conclusion of its movement during the preceding cycle.

In order to definitely establish the relationship between the movement of the valve 103 and the movement of the pointer 1 it is advisable to resort to the language of mathematics. Let us designate by "$P_1$" the total distance traversed by the pointer 1 counting from the beginning of the operation of the mechanism until the moment under consideration. Let us designate by "F" the total distance traversed by the valve 103 counting from the beginning of the operation of the mechanism until the same moment under consideration.

During this period the mechanism went through several complete cycles of its operation.

Now, since the carriage bar 2 moves to follow the movement of the pointer 1, the total distance traversed by the bar 2 for this period is evidently equal to the distance traversed by pointer 1. Designating the distance traversed by the bar 2 as "$D_2$" we may write therefore:

$$D_2 = P_1 \quad\quad\quad\quad (3)$$

During the cycle occurring at the moment under consideration the bar 3 traverses the distance in respect to the bar 2 which is proportional to the increment of movement of the pointer 1 for this cycle. Designating this relative movement of the bar 3 as "$D_3$" we may write:

$$D_3 = k_5 \frac{dP_1}{dT} \quad\quad\quad (4)$$

Where:

$\frac{dP_1}{dT}$ — average rate of movement (speed) of the pointer 1 during the cycle at the moment under consideration.

$k_5$ — arbitrary constant of proportionality depending upon the relative size of the friction wheel 34 and the gear 47.

That this equation is correct can be surmised from the consideration that the increment of the movement of the pointer 1 for a given definite length of time is the measure of the average speed of the pointer for this period.

During the cycle occurring at the moment under consideration the bar 4 traverses the distance in respect to the bar 3 which is proportional to the difference between the increment of movement of the pointer 1 for this and the preceding cycle.

Designating the distance traversed by the bar 4 in respect to the bar 3 as "$D_4$" we may write:

$$D_4 = k_6 \frac{d^2P_1}{dT^2} \quad\quad\quad (5)$$

Where:

$\frac{d^2P_1}{dT^2}$ — the average rate of the rate of movement (acceleration) of the pointer 1 during the cycle at the moment under consideration.

$k_6$ — the arbitrary constant of proportionality depending upon the relative size of the friction wheel 57 and the gear 55.

That this equation is correct can be surmised from the consideration that the difference between two successive increments of movement of the pointer 1 is the measure of the average acceleration of the pointer 1 for this period.

Since the bar 3 is carried by the bar 2, its movement is additive to the movement of the bar 2. Likewise, since the bar 4 is carried by the bar 3 its movement is additive to the movement of both the bar 2 and the bar 3.

We may write therefore, for the movement of the bar 4 in respect to the pedestal supports 6 counting from the beginning of operation of the mechanism and until that moment of the cycle under consideration when the movement of the bar 4 is completed and before it is returned into its original position in respect to the bar 3, and designating this movement at $D_t$:

$$D_t = D_2 + D_3 + D_4 \quad\quad (6)$$

Or by substituting for $D_2$, $D_3$ and $D_4$ their value from the Equations 3, 4 and 5:

$$D_t = P_1 + k_5 \frac{dP_1}{dT} + k_6 \frac{d^2P_1}{dT^2} \quad\quad (7)$$

Now, since roller 91 follows the portion 118 of the bar 4 it means that the total distance traversed by the roller 91 counting from the beginning of the operation of the mechanism and until the moment under consideration is equal to the total distance traversed by the bar 4 in respect to the pedestals 6 for the same period. Since the distance traversed by the valve 103 is proportional to the distance traversed by the roller 91 it means that the total distance through which the valve 103 is moved counting from the beginning of operation of the mechanism and until the moment under consideration is proportional also to the distance traversed by the bar 4 for the same period. Designating the total distance traversed by the valve 103 as "F" we may write:

$$F = k_7 D_t \quad\quad\quad\quad (8)$$

Where:

$k_7$ — the arbitrary constant of the proportionality depending upon the gear ratio in the valve 103 and in the return motion consisting of the Selsyn motors 104 and 105.

Substituting in the Equation (8) the value of $D_t$ from the Equation (7) we get finally:

$$F = k_7 P_1 + k_7 k_5 \frac{dP_1}{dT} + k_7 k_6 \frac{d^2P_1}{dT^2} \quad (9)$$

This equation represents the relationship between the movement of the pointer 1 and the movement of the valve 103, due to the operation of the parts of the mechanism so far described.

The remaining parts of the mechanism and their operation will now be explained.

The bevel gear 82 is mounted slidably on the drive member 9 and is suspended from the carriage bar 2 by the bearing 83. The gear 82 is meshing with the bevel gear 81 which is keyed to the shaft 123 suspended from the carriage bar 2 by the bearing 80. To the other end of the shaft 123 is keyed the propeller 75. This propeller is flat. The helical gear 119 is keyed to the shaft 122 near its left hand end. The shaft 122 is journaled in the bearings carried by the pedestal supports 6.

Opposite the propeller 75 is keyed to the shaft 122 the friction disc 124 the periphery of which is faced with semi-resilient material such as hard rubber. The disc 124 is so located on the shaft 122 that the disc is just the opposite of the center of the propeller 75 when the carriage bar 2 occupies the position corresponding to the normal desired position of the pointer 1. The normal desired position of the pointer 1 occurs of course when the function to be controlled (pressure, temperature, speed, etc.) and as indicated by the pointer 1 is at its normal desired value. The friction disc 124 is of a size just sufficient to be rotated by the propeller 75 in passing the disc 124.

The bevel gear 81 is twice the size of the bevel gear 82, with the result that the propeller 75 makes one revolution for two revolutions of the shaft 9.

The gear 119 is meshing with the helical gear 120 keyed to the lower end of the shaft 121 supported by the bearings 87 carried by the pedestal support 6. The upper end of the shaft 121 is provided with the worm screw 88 engaging the worm gear 89 mentioned previously.

The propeller 75 is so mounted on the shaft 123 as to make each of its blades pass the friction disc 124 during the period of the cycle while the bar 4 is moving in respect to the bar 3.

The parts of the mechanism just described operate as follows. At the position of the carriage bar 2 corresponding to the normal desired position of the pointer 1 the friction disc 124 is opposite the center of the propeller 75 and therefore the rotation of the propeller 75 does not affect the disc 124. The farther to the right or to the left from this position the carriage bar 2 moves the wider and wider portion of the propeller 75 comes into contact with the disc 124. It is clear therefore that the increment of rotation of the disc 124 for each cycle is proportional to the amount of the deviation of the pointer 1 from its normal position existing at this cycle.

The direction of rotation of the disc 124 will depend on the other hand upon the direction of the deviation of the pointer 1 from its normal position.

The rotation of the friction disc 124 is transmitted as a sliding motion to the screw 109 through the gears 119, 120 worm screw 88 and the worm gear 89 engaging by its threaded hole the screw 109. The hand of the thread of the screw 88 is so selected as to make the direction of the sliding movement of the screw 109, produced by the operation of the propeller 75, opposite to the direction of the deviation of the pointer 1 from its normal desired position. In other words, if the pointer 1 is occupying a position to the right from its normal position, the movement of the screw 109, produced by the operation of the propeller 75, will be to the left and vice-versa.

In order to facilitate the explanation of the operation of this part of the mechanism let it be assumed that the pointer 1 moves a certain distance from its neutral position and that it remains in that position. In this case the carriage bar 2, bar 3 and bar 4 will remain at the standstill. The propeller 75 will however pass the friction roller 124 and will rotate it each cycle an increment proportional to the deviation of the pointer 1 from its neutral position. The extent of this increment of rotation of the friction disc 124 will be proportional to the extent of the deviation of the pointer 1 so that if the deviation is twice the assumed one the increment of the rotation of the friction disc 124 will be twice as great for each cycle.

Since the increment of the rotation of the disc 124 results in the proportionate increment of the sidewise movement of the screw 109, it means that the valve 103 is moved at each cycle an increment proportional to the extent of the deviation of the pointer 1 from its normal position. This is due to the fact that the sidewise movement of the roller 91 away from the portion 118 closes the switch 96 with the result that the motor 102 starts to rotate as soon as the switch 104 is closed. The rotation of the motor 102 produces, on the other hand, the sidewise movement of the roller 91 toward the portion 118 and when the roller 91 reaches the portion 118 the switch 96 is opened and the motor 102 stops. It is evident that the number of turns of the motor 102 necessary to bring the roller 91 back onto the portion 118 is proportional to the distance which the propeller 75 moved the screw 109 away from the portion 118. It should be pointed out that the speed of the motor 102 is so selected that the above mentioned return movement of the roller 91 is completed long before the switch 104 is opened.

The increment of the movement of the valve 103 for a given definite period of time is, on the other hand the measure of the speed of the movement of the valve 103.

We may write therefore:

$$\frac{dF}{dT}=k_7k_8P_1 \quad\quad\quad\quad (10)$$

Where:

$k_8$—constant of proportionality depending upon the width of the blades of the propeller 75 and the ratio of the gears transmitting the rotation of the disc 124 into the movement of the screw 109.

The rest of the notations in the Equation (10) are the same those employed in the previous equations.

Multiplying both sides of the Equation (10) by $dT$ and integrating both sides we get:

$$F=k_7k_8\int_{T_1}^{T_2} P_1 dT \quad\quad\quad\quad (11)$$

This equation expresses the relationship between the movement of the pointer 1 and the movement of the valve 103 due to the operation of the propeller 75 and the parts actuated by it.

The movement of the valve 103 expressed by the Equation (11) is added to the movement of the valve 103 expressed by the Equation (9).

The total movement of the valve 103 due to the operation of all parts of the mechanism is evidently equal to the combination of the movement expressed by the Equation (10) and the movement expressed by the Equation (11).

Combining these two equations we get:

$$F=k_7k_8\int_{T_1}^{T_2} P_1 dT + k_7P_1 + k_7k_5\frac{dP_1}{dT} + k_7k_6\frac{d^2P_1}{dT^2} \quad (12)$$

The movement of the pointer 1 is proportional to the change of the controlled function (temperature, pressure, etc.) indicated by the pointer 1. Designating the amount of the deviation of this function from its desired normal value as "P" we may write:

$$P_1=k_9P \quad\quad\quad\quad (13)$$

Substituting the value of $P_1$ from the Equation (13) into Equation (12) we obtain:

$$F=k_7k_8k_9\int_{T_1}^{T_2} PdT + k_7k_9P + k_7k_5k_9\frac{dP}{dT} + k_7k_6k_9\frac{d^2P}{dT^2} \quad (14)$$

Calling:

$k_7k_8k_9=k_1$; $k_7k_9=k_2$; $k_7k_5k_9=k_3$ and $k_7k_6k_9=k_4$ we finally obtain the Equation (2) given before as expressing the characteristic of this regulator:

$$F=k_1\int_{T_1}^{T_2} PdT + k_2P + k_3\frac{dP}{dT} + k_4\frac{d^2P}{dT^2} \quad\quad (2)$$

It will be clear to those skilled in the art that the hydraulic operation of the valve 103 is just as feasible as the electric operation specifically illustrated. If the hydraulic operation is adapted the three-way valve will be substituted for the mercury switch 96 and a rotary valve substituted for the switch 104.

Likewise the return motion consisting of the Selsyn motors 104 and 105 could be easily changed over to a hydraulic or a mechanical operation.

An arrangement whereby the above described regulator can be adapted for the purpose of the automatic steering will now be described. Referring to Figs. 9, 10 and 11, the numeral 120 designates a compass of the kind generally used on ships.

The card 121 of this compass is supported on the pivot 122. In the center of the card 121 is located a light mirror 123 of rectangular shape. Its surface is inclined 45° in respect to the surface of the card 121. Close to the periphery of the card 121 and opposite its north point is located the mirror 124. This mirror is of the triangular shape and is also inclined 45° in respect to the surface of the card 121 so as to face the mirror 123. The periphery of the compass bowl is provided with the ring 126 having a screw thread on its outside surface. On this ring is mounted slidably the pedestal support 125. The support 125 is provided with the screw 136 engaging the thread of the ring 126. The screw 136 can be rotated by the wheel 137. If the screw 136 is rotated by hand the pedestal support 125 slides on the ring 126.

The pedestal support 125 carries a rectangular case 129 divided by the partition 138. The right hand side of this case has a slot 139 on its bottom surface. This slot is located directly above the mirror 124. In the case 129 just above the slot 139 is located the light sensitive cell 128.

The left hand side of the case 129 is provided with a cylindrical light guide 130. This guide is located directly above the mirror 123. In the case 129 just above the guide 130 is located the electric bulb 127. On the top of the case 129 is mounted a collector 131 having four rings in contact with four brushes. Two of these brushes supply the current to the bulb 127 and other two brushes collect the current generated by the cell 128. The current of the cell 128 is fed into a vacuum tube amplifier 133. The output of this amplifier is fed to the ammeter 135 having the indicator pointer 1 belonging to the regulator described previously. The characteristics of the cell 128 and of the amplifier 133 are so selected as to produce an uniform deflection of the pointer 1 for a given change in the intensity of light falling on the cell 128 irrespective of its absolute value.

This arrangement operates as follows. The light from the bulb 127 falls upon the mirror 123 and is deflected toward the mirror 124. A triangular beam of light from the mirror 124 is deflected upward and falls across the slot 139. When the ship is on her desired course the slot 139 is directly above the center of the mirror 124. The amount of light falling upon the cell 128 under this condition is proportional to the area the width of which is equal to the width of the slot 139 and the length of which is equal to the width of the mirror 124 across its middle.

If the ship deviates from her course the length of the beam passing through the slot 139 will be either increased or decreased due to narrower or wider portion of the triangular mirror 124 being now directly under the slot 139. It is obvious from this explanation that the deflection of the pointer 1 from its middle position will correspond to the deviation of the ship from her desired course as set by the screw 136.

Since the movement of the pointer 1 results in the movement of the ship's rudder the automatic steering of the ship is thus achieved. It should be pointed out that the characteristic of this regulator as expressed by the Equation (2) is particularly adapted for steering purposes since as explained before this characteristic counteracts the time lag due to inherent sluggishness of the compass as well as of the ship herself.

It should be pointed out that in this characteristic, when used for steering purposes, "P" in the Equation (2) stands for the amount (angle) of deviation of the compass from the desired course while "F" stands for the angle formed by the rudder with its neutral position, both angles measured at the same moment under consideration.

It is well to point out that the characteristic of the regulator as expressed by the Equation (2) can be modified to the extent of omitting the term $$k_4 \frac{d^2P}{dT^2}$$

by a simple expedient of removing the gear 16 and by locking together the bars 3 and 4 either by a set screw or by turning the cylinder 63 in such a position as to make the roller 62 pass through the gap 64. It may be pointed out also that the Equation (2) expressing the characteristic of this regulator is not exact due to inaccuracy introduced by the step by step motion of the valve 103. This inaccuracy can be reduced, however, to no matter how small value by shortening the length of each cycle. Therefore, the Equation (2) represents really the limit to which the characteristic of the control will approach when the length of the cycle of the regulator's operation is made very short.

I claim:

1. In a regulator for fluid or power supply operating in a regular cyclical manner, an indicating element uniformly actuated by the function dependent upon this fluid or power supply, flow regulating means proper for this fluid or power supply, four movable elements arranged to make the first movable element serve as the carriage for the second movable element and to make the second movable element serve as the carriage for the third movable element, means working from and in conjunction with the indicating element to move at each cycle the first movable element a distance proportional to the increment of actuation of the indicating element for this cycle, means working from and in conjunction with the first movable element to move at each cycle the second movable element in respect to the first movable element a distance proportional to and equal in direction to the distance traversed by the first movable element for this cycle, means working from and in conjunction with the first and the second movable elements to move at each cycle the third movable element in respect to the second movable element a distance proportional in the amount and equal in sign to the difference between the distance traversed by the first movable element for this cycle and the distance traversed by the first movable element for the previous cycle, means working from and in conjunction with the first movable element to move each cycle the fourth movable element a distance proportional to and opposite in direction to the distance between the position occupied by the first movable element at the conclusion of its movement for this cycle and the position of the first movable element corresponding to the normal desired position of the indicating instrument, means to return at the conclusion of each cycle the second and the third movable elements into their original position in respect to the first and the second movable elements respectively, means to move each cycle the fourth movable element near the conclusion of each cycle but before the second and third movable elements are returned into their original position, a distance necessary to make the reference point of the fourth movable element to coincide with the reference point of the third movable element, means working from and in conjunction with the fourth movable element to actuate each cycle the flow regulating means proper an increment proportional in the amount and equal in sign to the last described distance traversed by the fourth movable element.

2. In a regulator for fluid or power supply operating in a regular cyclical manner, valve means controlling the fluid or power supply, an indicating instrument uniformly actuated by the function dependent upon this fluid or power supply, three movable members arranged to make the first movable member serve as a carriage for the second movable member, means working from and in conjunction with the indicating instrument to move at each cycle the first movable member a distance proportional to and of the same direction as the increment of actuation of the indicating instrument for this cycle, means working from and in conjunction with the first movable member to move each cycle the second movable member in respect to the first movable member a distance proportional to and of the same direction as the distance traversed by the first movable member for this cycle, means returning near the end of each cycle the second movable member into its original position in respect to the first movable member, means working from and in conjunction with the second movable member to move the third movable member, in the interval of each cycle after the movement of the second movable element is completed and before this member is returned into its original position, a distance necessary to make the reference point of the third movable member coincide with the reference point of the second movable member and to leave the third movable member in this new position until the corresponding period of the next cycle, and means working from and in conjunction with the third movable member to actuate each cycle the said valve means an increment proportional to and of the direction corresponding to the distance traversed by the third movable member for this cycle.

3. In a regulator for fluid or power supply operating in a regular cyclical manner, valve means controlling the fluid or power supply, an indicating instrument uniformly actuated by the function dependent upon this fluid or power supply, three movable members arranged to make the first movable member serve as a carriage for the second movable member, means working from and in conjunction with the indicating instrument to move at each cycle the first movable member a distance proportional to and of the same direction as the increment of actuation of the indicating instrument for this cycle, means working from and in conjunction with the first movable member to move each cycle the second movable member in respect to the first movable member a distance proportional to and of the same direction as the distance traversed by the first movable member for this cycle, means returning near the end of each cycle the second movable member into its original position in respect to the first movable member, means working from and in conjunction with the first movable member to move each cycle the third movable member a distance proportional to and opposite in direction to the distance between the position occupied by the first movable member at the conclusion of its movement for this cycle and the position of the first movable member corresponding to the normal desired position of the indicating instrument, means working from and in conjunction with the second movable member to move the third movable member each cycle, in the interval after the above specified movement of the second and third movable members is completed and before the second movable member is returned into its original position, a distance necessary to make the reference point of the third movable member coincide with the reference point of the second movable member and to leave the third movable member in this new position until the corresponding period of the next cycle, and means working from and in conjunction with the third movable member to actuate each cycle the valve means an increment proportional to and of the direction corresponding to the last described movement of the third movable member.

4. In a regulator for fluid or power supply operating in a regular cyclical manner, valve means controlling the fluid or power supply, an indicating instrument uniformly actuated by the function dependent upon this fluid or power supply, two movable members, means working from and in conjunction with the indicating instrument to move at each cycle the first movable member a distance proportional to and of the same direction as the increment of actuation of the indicating instrument for this cycle, means moving the second movable member a distance proportional to and opposite in direction to the distance between the position occupied by the first movable member at the conclusion of its movement for this cycle and the position of the first movable member corresponding to the normal desired position of the indicating instrument, means moving the second movable member, in the interval of each cycle after the above specified movement of the first and second movable member is completed, a distance necessary to make the reference point of the second movable member coincide with the reference point of the first movable member, and means actuating the said valve means each cycle an increment proportional to and of the direction corresponding to the last described movement of the second movable member for this cycle.

5. In an automatic regulator operating in a regular cyclical manner for maintaining a function at a substantially constant value, an impulse receiving element actuated in unison with and in proportion to the extent of deviation of the function from its normal value, a final operating member for controlling the flow of an agent affecting the variation of the function, a means for producing each cycle an effect which is proportional in magnitude and equal in direction to the total deviation of said function from its normal value as measured at this cycle, a means for producing each cycle an effect which is proportional in magnitude and equal in direction to the increment of actuation of the impulse receiving element for this cycle, a means for producing each cycle an effect which is proportional in magnitude and equal in direction to the difference between the second named effect for this and the preceding cycle, a means for producing each cycle an effect which is proportional in magnitude and equal in direction to the difference between the third named effect for this and the preceding cycle, and means for actuating the final operating member each cycle an increment proportional in magnitude and equal in direction to the additive combination of the above recited four effects.

6. In an automatic regulator operating in a regular cyclical manner for maintaining a function at a substantially constant value, an impulse receiving element actuated in unison with and in proportion to the extent of deviation of the function from its normal value, a final operating member controlling the application of an agent affecting the variation of the function, a means for producing each cycle an effect which is proportional in magnitude and equal in direction to the increment of actuation of the impulse receiving element for this cycle, a means for producing each cycle an effect which is proportional in magnitude and equal in direction to the difference between the first named effect for this and the preceding cycle, a means for producing an effect which is proportional in magnitude and equal in direction to the difference between the second named effect for this and the preceding cycle, and means for actuating each cycle the final operating member an increment proportional in magnitude and equal in direction to the additive combination of the above recited three effects.

SERGEI D. MITEREFF.